(12) United States Patent
Alley

(10) Patent No.: US 9,116,531 B2
(45) Date of Patent: Aug. 25, 2015

(54) METHODS AND SYSTEMS FOR CURRENT OUTPUT MODE CONFIGURATION OF UNIVERSAL INPUT-OUTPUT MODULES

(71) Applicant: General Electric Company, Schenectady, NY (US)

(72) Inventor: Daniel Milton Alley, Earlysville, VA (US)

(73) Assignee: General Electric Company, Schenectady, NY (US)

( * ) Notice: Subject to any disclaimer, the term of this patent is extended or adjusted under 35 U.S.C. 154(b) by 233 days.

(21) Appl. No.: 13/779,666

(22) Filed: Feb. 27, 2013

(65) Prior Publication Data

US 2014/0239923 A1 Aug. 28, 2014

(51) Int. Cl.
*G06F 3/00* (2006.01)
*G05F 1/10* (2006.01)
*G05B 9/03* (2006.01)
*G05B 19/05* (2006.01)

(52) U.S. Cl.
CPC .. *G05F 1/10* (2013.01); *G05B 9/03* (2013.01); *G05B 19/058* (2013.01); *G05B 2219/1191* (2013.01); *G05B 2219/14016* (2013.01)

(58) Field of Classification Search
CPC .......... G05F 1/10; G05B 9/03; G05B 19/058; G05B 2219/14016; G05B 2219/1191
See application file for complete search history.

(56) References Cited

U.S. PATENT DOCUMENTS

| | | | | |
|---|---|---|---|---|
| 3,798,606 A | * | 3/1974 | Henle et al. | 714/797 |
| 4,412,136 A | * | 10/1983 | Kaya et al. | 290/40 R |
| 4,633,163 A | | 12/1986 | Dillon | |
| 5,954,833 A | * | 9/1999 | Garcia et al. | 714/745 |
| 6,732,300 B1 | | 5/2004 | Freydel | |
| 7,047,440 B1 | * | 5/2006 | Freydel et al. | 714/11 |
| 7,102,343 B1 | * | 9/2006 | Brown | 323/361 |
| 7,504,975 B2 | * | 3/2009 | Meagher | 341/142 |
| 7,974,793 B2 | | 7/2011 | Weddle | |
| 8,688,862 B1 | * | 4/2014 | Alley | 710/1 |
| 2003/0188221 A1 | | 10/2003 | Rasmussen et al. | |
| 2007/0220367 A1 | * | 9/2007 | Smith et al. | 714/48 |
| 2007/0260939 A1 | * | 11/2007 | Kammann et al. | 714/48 |
| 2011/0313580 A1 | | 12/2011 | Bakhmach | |
| 2014/0163907 A1 | * | 6/2014 | Alley et al. | 702/58 |

OTHER PUBLICATIONS

The Trident Supports a Complete Range of Modules for Applications with Low Point Counts and Distributed I/O; Product Specifications; pp. 17-40, Jun. 2011.
Woodward; Operations Manual—MicroNet TMR 5009C Digital Control System; Manual B26320V1; 2005; vol. 1.

(Continued)

*Primary Examiner* — Jing-Yih Shyu
(74) *Attorney, Agent, or Firm* — Fletcher Yoder, P.C.

(57) ABSTRACT

A system includes a triple modular redundant (TMR) control system comprising three controllers. Each controller of the three controllers includes a current driver system configured to detect and regulate a portion of a total current output of the TMR control system, and a universal input-output (UIO) system comprising a plurality of universal input-output (UIO) ports, wherein the universal input-output (UIO) system is configured to detect the portion of the total current output and the total current output of the TMR control system via one or more of the plurality of UIO ports, compare the portion of the total current output and the total current output of the TMR control system, and adjust the portion of the total current output according to a predetermined total current output threshold.

20 Claims, 7 Drawing Sheets

(56) References Cited

OTHER PUBLICATIONS

International Search Report and Written Opinion issued in connection with corresponding PCT Application No. PCT/US2014/ on Jul. 28, 2014.

Jian-Xiao Zou et al, "Design and Reliability Analysis of Emergency Trip System with Triple Modular Redundancy", Communications, Circuits and Systems, 2009 ICCAS 2009, International Conference on, IEEE, Piscataway, NJ, USA, Jul. 23, 2009 pp. 1006-1009.

\* cited by examiner

METHODS AND SYSTEMS FOR CURRENT OUTPUT MODE CONFIGURATION OF UNIVERSAL INPUT-OUTPUT MODULES

BACKGROUND

The subject matter disclosed herein relates to universal input-output (UIO) devices, and more particularly to universal input-output (UIO) devices useful in implementing triple modular redundancies in operation.

Control systems may generally include controllers, processors, and sensors to detect and control the operating conditions of one or more industrial machines. Certain universal input-output (UIO) modules used within the control systems may generally include a simplex mode of operation due to the complexity of interconnections associated with other modes of operation. A Triple modular redundancy (TMR) mode of operation may include specialized I/O modules for each specific type (e.g., analog, discrete, digital) of sensed signals. It may be useful to reduce complexities associated with TMR modes of operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a triple modular redundant (TMR) control system comprising three controllers. Each controller of the three controllers includes a current driver system configured to detect and regulate a portion of a total current output of the TMR control system, and a universal input-output (UIO) system comprising a plurality of universal input-output (UIO) ports, wherein the universal input-output (UIO) system is configured to detect the portion of the total current output and the total current output of the TMR control system via one or more of the plurality of the UIO ports, compare the portion of the total current output and the total current output of the TMR control system, and adjust the portion of the total current output according to a predetermined total current output threshold.

In a second embodiment, a system includes a triple modular redundant (TMR) control system including three controllers. Each controller of the three controllers includes a universal input-output (UIO) system configured to detect a portion of a total current output and the total current output of the TMR control system via a plurality of the universal input-output (UIO) ports, compare the portion of the total current output and the total current output of the TMR control system, and adjust the portion of the total current output to maintain the total current output of the TMR control system based at least in part on the operability of one or more of the three controllers.

In a third embodiment, a non-transitory computer-readable medium includes computer executable code stored thereon. The code includes instructions detect a portion of a total current output and the total current output of the triple module redundant (TMR) control system via a plurality of the universal input-output (UIO) ports, compare the portion of the total current output and the total current output of the TMR control system, and adjust the portion of the total current output according to a predetermined total current output threshold.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to a universal input-output (UIO) device supporting TMR current output drivers, among others. The UIO device may be based on a switching block connecting control system resources to I/O terminals, where the block, amplifiers, and other data processing circuitry may be contained within a universal I/O application-specific integrated circuit (ASIC). The present embodiments allow for the ASIC to be connected in TMR, dual redundancy, and/or simplex configuration, to sensing resistors and terminals of a field device control terminal board. Without the presently disclosed embodiments, TMR and dual redundancy current output modes of operation may require dedicated (e.g., TMR-specific and dual redundancy-specific) I/O devices to implement redundancy modes of operation. However, the presently disclosed embodiments may allow the use of a universal I/O device (e.g., implemented via ASIC) with TMR, dual redundancy, and/or simplex connections for analog, discrete, and digital input and output signal types (e.g., voltage signals, current signals, physical sensor signals, communication signals, and so forth). As used herein, "universal input-output (UIO)" may refer to a processor based interface module useful in allowing user controller devices (e.g. programmable logic controllers (PLCs), distributed control systems (DCS)) to control, for example, field devices by providing universal (e.g., applicable to various input and output signals) configurable input and output ports.

Figure 1:
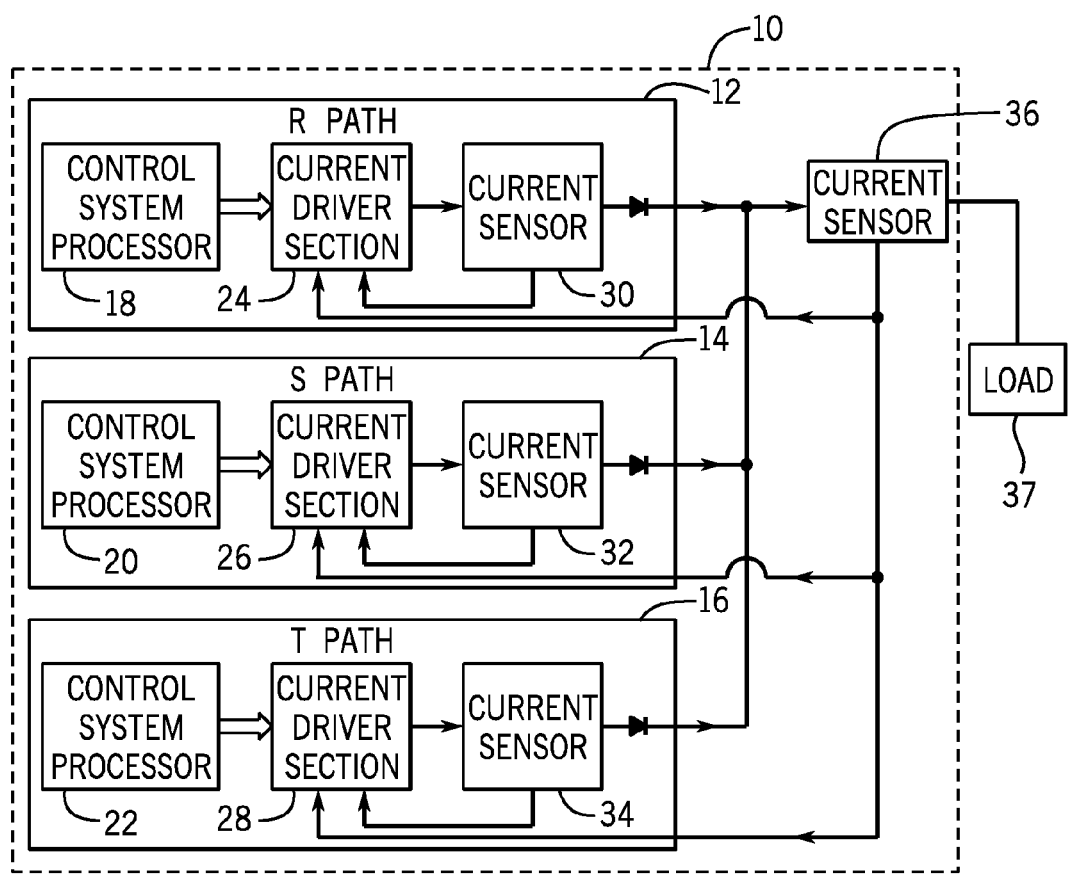
FIG. 1 is a block diagram of an embodiment of a industrial controller system in accordance with present embodiments.

With the foregoing in mind, it may be useful to describe an embodiment of an industrial controller system, such as an example controller system 10 illustrated in FIG. 1. The system 10 may include a plurality (e.g., 1, 2, 3, and so forth) of independent controllers 12, 14, and 16. Nevertheless, in one embodiment, the three control modules 12, 14, and 16 may be interconnected via a single enclosure and/or one or more electronic terminal boards, a configuration which may be referred to herein as triple modular redundancy (TMR) configuration. The TMR configuration may be used for system and operational redundancy, or otherwise system and operational failsafe. However, it should be appreciated that other embodiments may include dual redundancy mode of operation, in which only two of the three control modules 12, 14, and 16 may be operable, or a simplex mode of operation, where only one of the three control modules 12, 14, and 16 may be operable. As will be further appreciated, in such cases, the operable control modules (e.g., control modules 14 and 16 in a dual mode of operation or only control module 16 in a simplex mode of operation) may be programmed to compensate for the control module(s) that may be inoperable. The control modules 12, 14, and 16 may each include one or more processors (e.g., processors 18, 20, and 22), current driver sections (e.g., current driver sections 24, 26, and 28), and sensors (e.g., current sensors 30, 32, 34, and 36). In one embodiment, the control modules 12, 14, and 16 may be communicatively coupled to a load 37 to regulate one or more outputs of the load 37. For example, the load 37 may be a control valve or actuator tied within the system to control a turbine (e.g., gas, wind, hydro and/or steam), a generator, or similar synchronous and/or asynchronous machine. The sensors 30, 32, and 34 may provide feedback signals, which may, in certain embodiments, represent fractions of one or more operating parameters. For example, the feedback signals may each represent a fraction (e.g., one-third) of the controlled system's current, voltage, temperature, pressure, flow, clearance (e.g., distance between stationary and rotating components) and so forth, of the load 37. Because the control modules 12, 14, and 16 may each operate to regulate fractions of substantially the same operating parameter (e.g., current, voltage, or combinations thereof), the current sensor 36 may be provided to detect the total current output to the load 37. Although not illustrated, in certain embodiments, the control system 10 may specifically control one or more actuators (e.g., switches, positioners, and/or valves such as, single valve, split-ranged valve) that may be coupled to the load 37.

Figure 2:
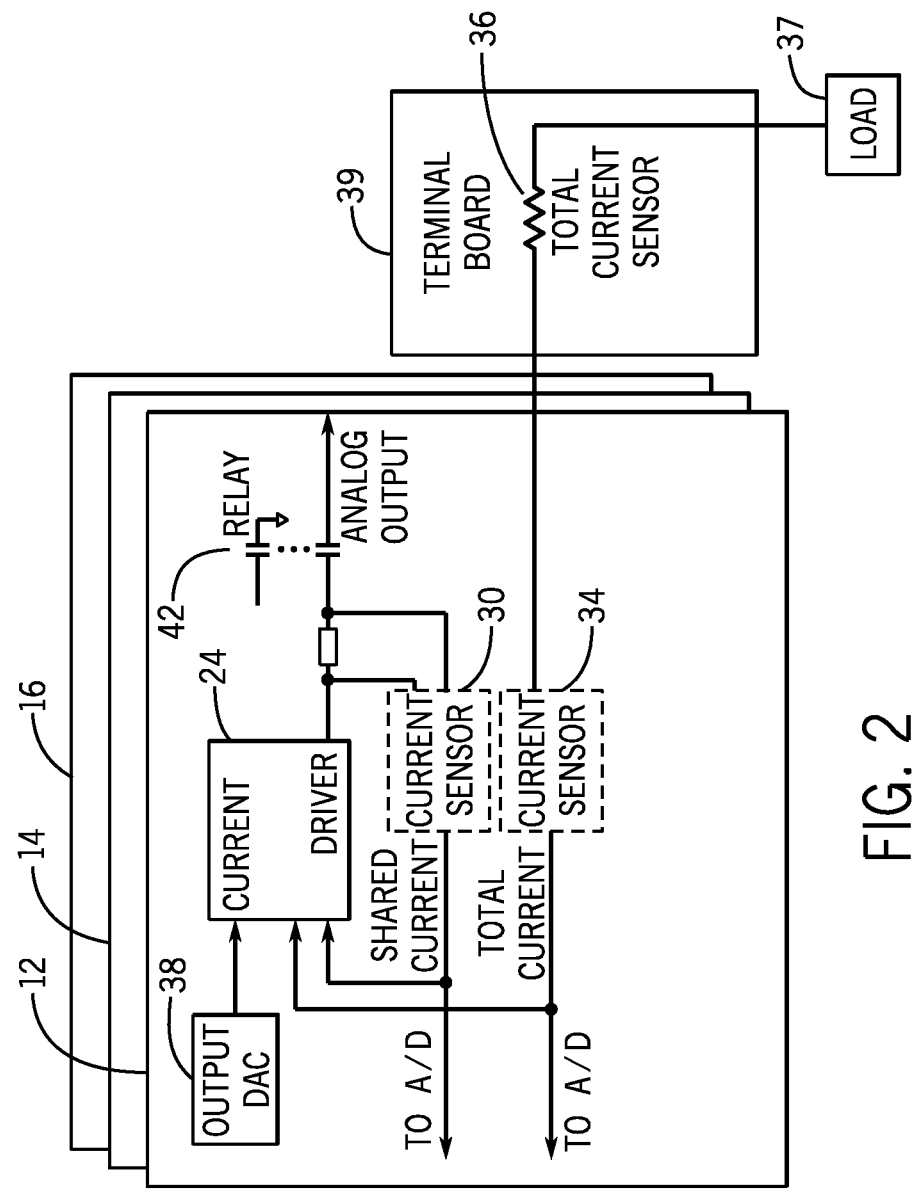
FIG. 2 is a block diagram of an embodiment of a Triple Modular Redundancy (TMR) controller included within the system of FIG. 1 in accordance with present embodiments

FIG. 2 is an example embodiment of one or more of the controller modules 12, 14, and 16 including their respective current driver sections 24, 26, and 28. As depicted, the current sensor 30 may be useful to detect, for example, one-third of the total current to independently regulate the current outputted to a terminal board 39, and by extension, to the load 37. Similarly, the current sensor 36 may be useful to detect the total current received from the load 37. The current sensor 30 and the current sensor 34 may each be coupled to a digital-to-analog converter (DAC) 38. In particular, if the current sensor 30 detects, for example, that the current flowing to the load is significantly above (e.g., 35% or more) and/or below (e.g., 31% or less) the one-third of the total current, the current driver 24 may output a trip signal (e.g., approximately between 4-20 milliamp (mA)) to a relay 42, and by extension, control the operation of the load 37. However, as previously noted, because the control modules 12, 14, and 16 and corresponding current driver sections 24, 26, and 28 may operate independently, as well as include TMR-specific I/O devices to regulate the operating conditions of the load 37, it may be useful to provide a UIO device to reduce complexity of the controller system 10.

Figure 3:
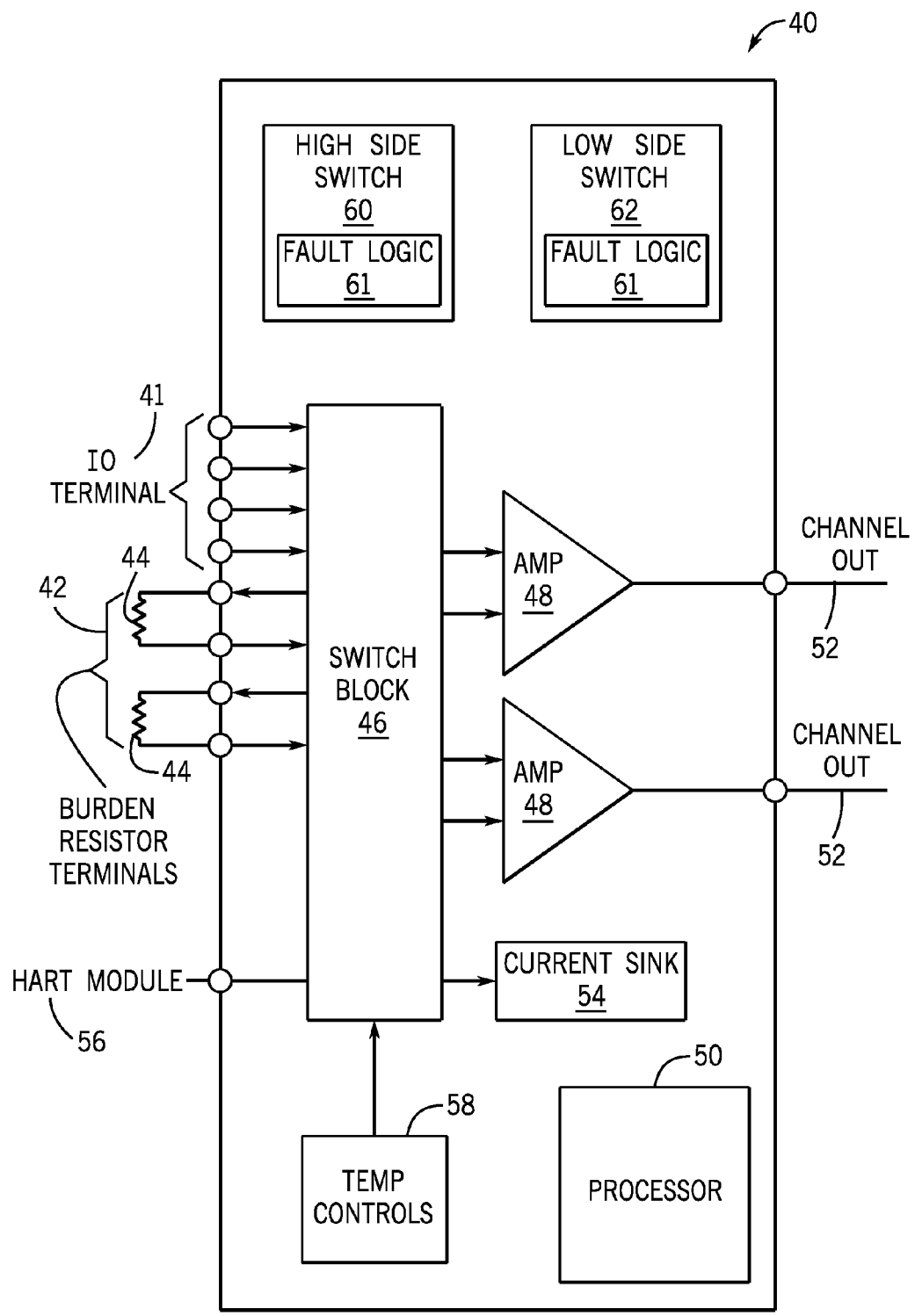
FIG. 3 is a block diagram of an embodiment of a universal I/O device in accordance with present embodiments.

Accordingly, FIG. 3 illustrates an embodiment of a UIO device implemented as an application-specific integrated circuit (ASIC) 40 that may be useful in reducing complexity of the controller system 10, such as, for example, by providing a universal I/O device to implement TMR, dual, and/or simplex redundancy current output modes of operation. It should be appreciated that the ASIC 40 may be a mixed signal (e.g., analog, discrete, and/or digital) device, combining, for example, both analog and digital circuitry in support of various modes of operation. Specifically, the ASIC 40 may be a front-end (FE) system useful in detecting analog and/or digital inputs and outputs (e.g., current inputs and outputs, voltage inputs and outputs, temperature sensor inputs and outputs, pressure inputs and outputs, flow inputs and outputs, clearance inputs and outputs, communication inputs and outputs, and so forth). As illustrated, the ASIC 40 supports two channels of UIO and may include four I/O terminals 41, as well as four burden resistor terminals 42 that may be coupled to burden resistors 44. Moreover, each of the I/O terminals 41 and the burden resistor terminals 42 couple to a switch block 46. The switch block 46 may include multiple switches that may be toggled according to the type of sensor connected to the I/O terminals 41. After the signals are routed in the switch block 46, the signals or a portion of the signal (e.g., sensed current and/or voltage) are directed to a respective amplifier 48 (e.g., operational amplifier). The amplifier 48 may be useful to attenuate and/or amplify the signals according to a selection of a communication method and/or sensor type, and may be communicatively coupled to the output channels 52.

In certain embodiments, the ASIC 40 may also include one or more internal processor(s) 50 and/or other data processing and sensing circuitry that may be communicatively coupled to a memory to execute instructions for carrying out the presently disclosed techniques. These instructions may be encoded in programs or code stored in tangible non-transitory computer-readable medium, such as the memory and/or other storage. The processor 50 may be a general purpose processor, system-on-chip (SoC) device, or some other processor configuration. In one embodiment, the processor 50 may be a field programmable gate array (FPGA) device useful in implementing user-configurable control logic in support of TMR, dual redundancy, and/or simplex redundancy current output modes of operation. The ASIC 40 may, in addition, include metrology circuitry, analog front end (AFE) circuitry, voltage reference circuitry, real-time clocks, data converters (e.g., analog-to-digital (A/D) converters and digital-to-analog converters (DACs)), and similar electronic circuitry and processing architectures.

Moreover, the ASIC 40 may include one or more current sinks 54, for example, for each channel that may be connected to one or more I/O terminal(s) 41 when certain sensor types are connected to the I/O terminals 41. For example, in some embodiments, the current sink 54 may be coupled to the I/O terminal 41 when the respective I/O terminal 41 is coupled to an externally wetted contact where current provided by the external power source through the contact is to be regulated to, for example, approximately 7.5 mA or less when the contact is closed.

The ASIC 40 may further include a (Highway Addressable Remote Transducer) HART module 56 that may receive signals from a HART device/modem. The HART module 56 may also include HART voltage drivers and/or other suitable HART components that enable the ASIC 40 to convert HART signals for processing by the processor 50. Additionally, the ASIC 40 may include temperature controls 58. In some embodiments, the temperature controls 58 may include a temperature sensor and/or logic for disabling one or more switches within the switch block 46 when the sensed temperature surpasses a threshold temperature.

The illustrated embodiment of the ASIC 40 may also include a high side switch 60 and a low side switch 62. The switches 60 and 62 may each include fault logic 61 that includes timer settings, voltage sensor inputs, current sensor (e.g., current sensors 30, 32, 34, and 36) inputs, and/or temperature sensor inputs that may be shared between the switches 60 and 62. The fault logic 61 of each switch may determine various faults within the ASIC 40. For example, the fault logic 61 may determine that an output current exceeds a timed threshold for a period beyond a certain period of time. The fault logic 61 may also determine that the output current exceeds a higher threshold for any period of time, where the higher threshold is greater than the timed threshold. In other words, the fault logic 61 may track current in relation to two thresholds: a maximum value and a value that is allowed for short durations. Additionally, the fault logic 61 may determine that a switch has been shorted, for example, by determining that there is no voltage drop across the switch when the switch is open. The fault logic 61 may also determine that a switch is improperly open by determining that the voltage drop across the switch is too high when the switch is closed. As will be further appreciated, the fault logic 61 may include logic to detect the current (e.g., operating current and/or fault current) detected and regulated by each of the control modules 12, 14, and 16, as well as the total current output of the controller system 10.

Figure 4:
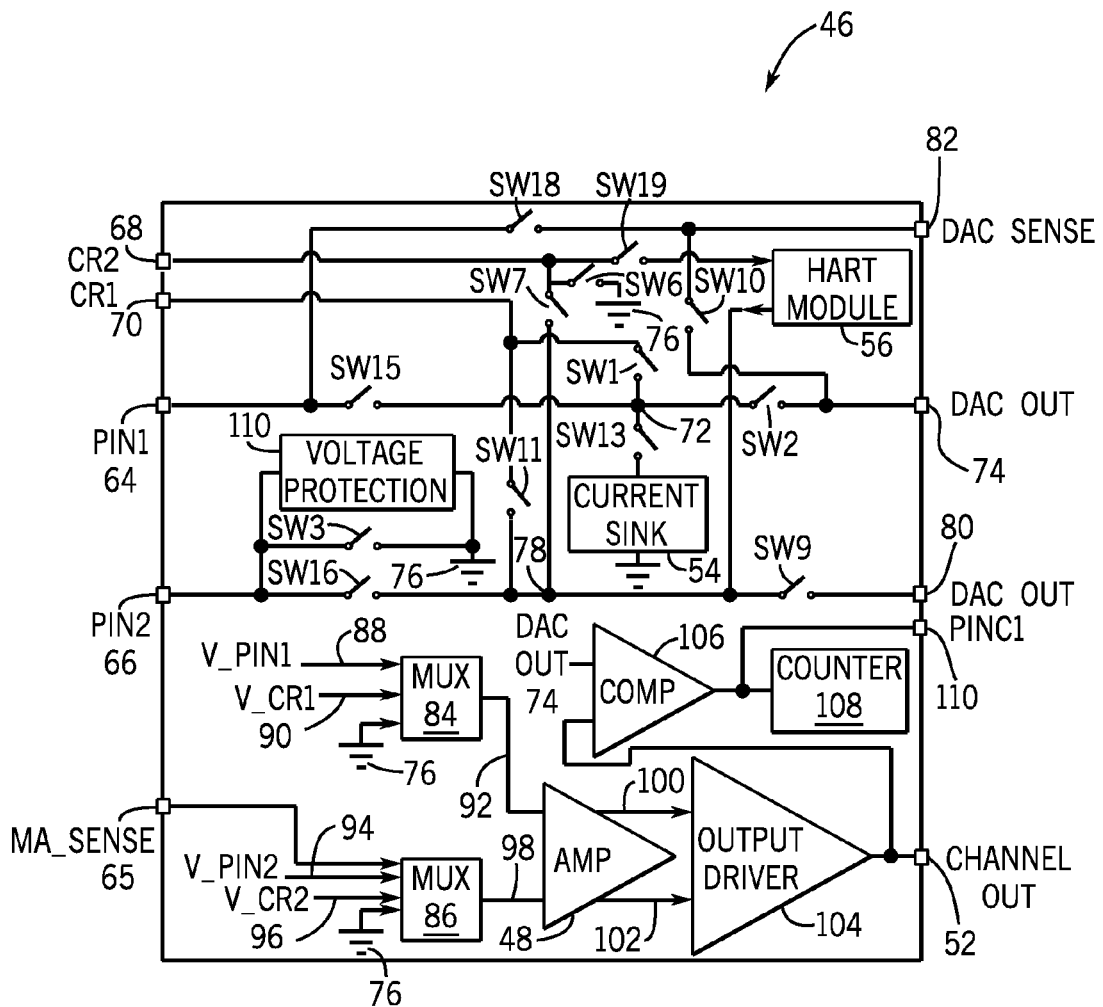
FIG. 4 is a block diagram of an embodiment of a switch block included within the universal I/O device of FIG. 3 in accordance with present embodiments.

FIG. 4 is an embodiment illustrating the switch block 46 which may be included in the ASIC 40 of FIG. 3. As previously described, the ASIC 40 may include a single channel having two I/O terminals 41 coupled to the switch block 46. Specifically, the switch block 46 includes a Pin1 input terminal 64 and a Pin2 input terminal 66. In the illustrated embodiment, the switch block 46 also includes two burden resistor terminals 68 and 70 as well as the channel out 52. Additionally, the switch block 46 includes switches SW1, SW2, SW3, SW6, SW7, SW9, SW10, SW11, SW13, SW 15, SW16, SW18, and SW19. Each of the switches may include different resistance values or a combination of resistance values based on desired circuit properties. For example, in certain embodiments, the switches SW1, SW2, SW7, SW15, and SW16 may include a 10 ohm resistance, the switches SW6, SW9, SW10, SW11, and SW18 may include an approximately 100 ohm resistance, and the switch SW19 may include an approximately 20 ohm resistance. In other embodiments, any switch may include any suitable resistance such as 5, 10, 15, 20, 25, 30, or more ohms where the ASIC design trade off may increase die area and manufacturing cost as the switch resistance decreases.

As illustrated, each of the switches may toggle an electrical connection according to the inputs and outputs detected at the I/O terminals 41. For example, SW1 toggles a connection between the burden resistor terminal 70 and a node 72 and minimizes voltage drop on switches used in analog functions. Similarly, SW2 toggles the connection between node 72 and DAC out 74 and minimizes a voltage drop across SW13. Likewise, SW3 toggles the connection between Pin2 inputs terminal 66 to internal ground 76. Moreover, SW3 allows bidirectional voltage blocking and current flow according to a selected mode and/or user terminal. SW3 allows switching upon voltage sensing to protect against high current faults due to incorrect configuration and/or user wiring. SW6 toggles a connection between the burden resistor terminal 68 and internal ground 76. SW7 toggles a connection between the burden resistor terminal 68 and a node 78, and SW9 toggles a connection between the node 78 and the DAC out 80. SW10 toggles a connection between a DAC out 74 and a DAC sense 82 that senses a voltage from the respective DAC unit 38 that may receive voltages from the processor 18, an internal power source, and/or other suitable power sources. Additionally, in some embodiments, the processor 50 may be used to select the signal that will be sent through the DAC sense 82. SW11 toggles a connection between the node 78 and the burden resistor terminal 70. SW13 toggles a connection between the current sink 54 and the node 72. SW15 toggles a connection between Pin1 input terminal 64 and the node 72. SW16 toggles a connection between the Pin2 input terminal 66 and the node 78. SW18 toggles a connection between the DAC sense 82 and Pin1 input terminal 64. SW19 toggles a connection between HART module 56 and the burden resistor terminal 68.

In addition to the switch block 46, the ASIC 40 may include a Pin1 MUX 84 and a Pin2 MUX 86. The Pin1 MUX 84 receives an input V_pin1 88 that emulates or contains a voltage occurring at the Pin1 input terminal 64. The Pin1 MUX 84 also receives a V_CR1 90 that emulates or contains a voltage occurring at the burden resistor terminal 70. Additionally, the Pin1 MUX 84 may receive the internal ground 76 connection, a test voltage, and/or HART signals. As can be appreciated, the Pin1 MUX 84 multiplexes each of the received signals and directs a Pin1 multiplexed signal 92 to the amplifier 48 that provides a programmable amplification or attenuation. Similar to the Pin1 MUX 84, the Pin2 MUX 86 receives V_Pin2 94 (e.g., voltage of Pin2 input terminal 66), V_CR2 96 (e.g., voltage of burden resistor terminal 68), MA_SENSE 65 (e.g., current sensed at far side of series resistor 36 for total current flow), the internal ground 76, and/or other suitable inputs (e.g., test voltage, HART signals, etc.). The Pin2 MUX 86 then multiplexes the received signals to produce a Pin2 multiplexed signal 98 that is sent to the amplifier 48. Additionally, in certain embodiments, the amplifier 48 may send an adjusted voltage 100 as well as an inverted adjusted voltage 102 to an output driver 104. In other embodiments, the amplifier 48 may send only the adjusted voltage 100 to the output driver 104. Additionally, in some embodiments, the output driver 104 or other circuitry may create an inverse adjusted voltage 102 from the adjusted voltage 100. The output from the output driver 104 is then directed to the channel out 52. Although the illustrated embodiment of channel out 52 only shows one terminal, some embodiments may include a voltage channel out 52 as well as an inverted voltage channel out that inverts the voltage of the voltage channel out 52.

The ASIC 40 may further include a comparator 106 that compares the channel out 52 to the DAC out 74 with its output available at PINC1 110. The comparator 106 may compare a threshold voltage that may be set externally through the DAC sense 82. In other embodiments, the comparator 106 may receive a generated threshold source (e.g., current or voltage source) as an input in place of the DAC out 74. In certain embodiments, the threshold source may be set through the processor 50 in response to a user selection and/or sensed signal properties (e.g., current and/or voltage). Additionally, the ASIC 40 may include a counter 108 that may track the period of time (e.g., clock pulses) that has elapsed while the channel out 52 emits a signal above a threshold when the comparator 106 determines that the channel out 52 surpassed the threshold. For example, if the channel out 52 has a current above a timed threshold (e.g., DAC out 74) for more than 10 clock cycles the counter 108 would count to 10. In certain embodiments, when the counter 108 has surpassed a time limitation value (e.g., 12 clock cycles), the ASIC 40 may disable one or more of the switches (e.g., SW1, SW2, SW3, SW6, SW7, SW9, SW10, SW11, SW13, SW 15, SW16, SW18, and/or SW19) to block potential damage to the ASIC 40. The results of the comparison and/or information stored in the counter 108 may be accessed via a comparator pin PINC1 110.

As previously discussed, in certain embodiments, the ASIC 40, as discussed above with respect to FIGS. 3 and 4, may be used to facilitate the implementation of TMR, dual redundancy, and/or simplex current output modes of operation. For example, in referring to FIG. 5, the same or similar ASIC 40 may be included within each of the control modules 12, 14, and 16. However, for the purpose of illustration, the ASIC 40 and TMR and dual redundancy system embodiment will be discussed with respect to the control module 12. Furthermore, while the present embodiments are discussed with respect to current outputs, it should be appreciated that the ASIC 40 may allow TMR connections useful for voltage sensing, resistance temperature detectors (RTDs), thermocouples, and other similar modes of operation.

Figure 5:
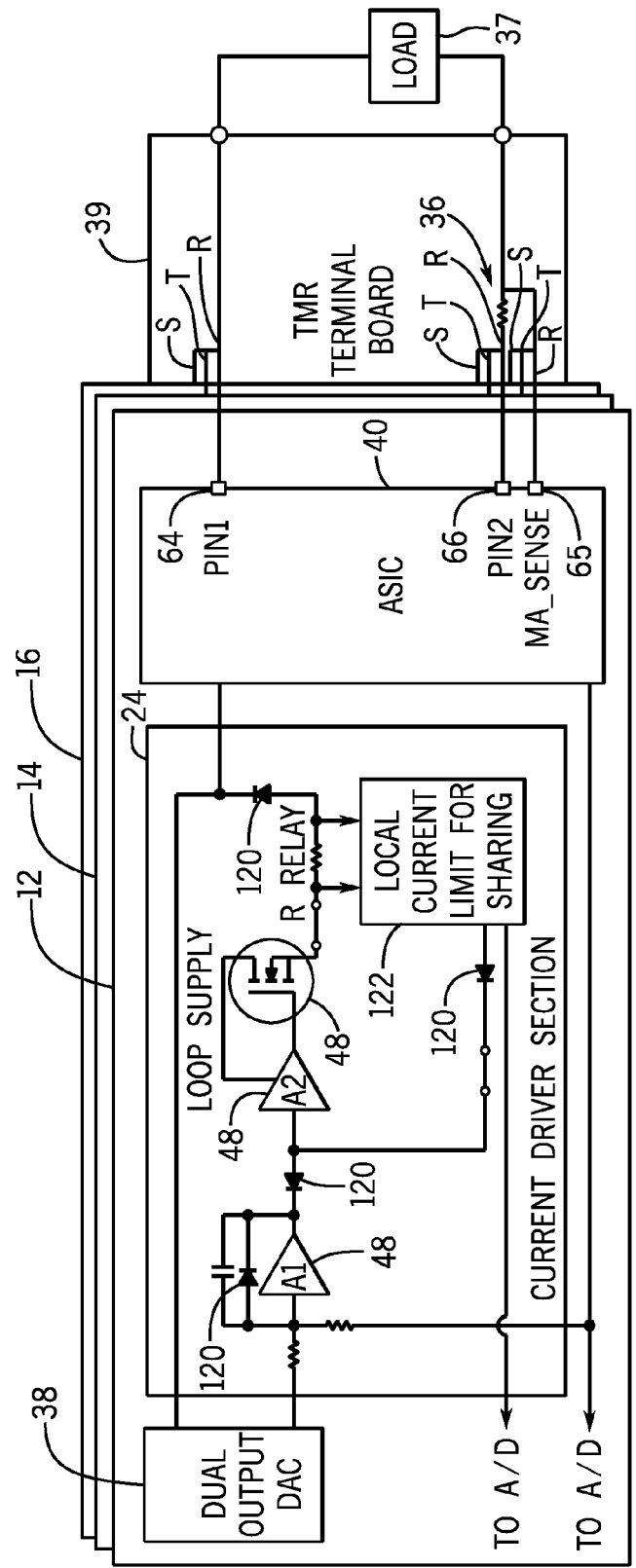
FIG. 5 is a block diagram of an embodiment of a universal I/O device in accordance with present embodiments.

In certain embodiments, as depicted in FIG. 5, the ASIC 40 may be communicatively coupled between the current driver section 24 and the terminal board 39. The current driver section 24 within the module may be used to support to TMR, dual redundancy, and/or simplex current output modes of operation. In TMR operation, the current driver section 24 may include an analog current sharing loop including amplifiers 48, diodes 120, and a local current sensor 122. The current driver section 24 may sense and operate at, for example, a share (e.g., 33%) of the total current (e.g., 100%) setpoint of all three of the control modules 12, 14, and 16. Similarly, the corresponding current driver sections 26 and 28 of control modules 14 and 16 may each concurrently sense and operate at 33% of the total current setpoint. The local current sensor 122 may measure and detect the total current supplied by the control module 12, and compare to the sensed shared current (e.g., 33%). Specifically, the total current (e.g., 100%) at the TMR terminal board 39 flowing through resistor 36 may be detected by the amplifier 48 of the ASIC 40 which may be used to adjust the current driver section loop to maintain the respective current setpoint (e.g., 33% of 100 mA). It should also be appreciated that the ASIC 40 may also be useful in implementing dual redundancy (e.g., 50% current sharing) in the case, for example, that one of the control modules 12, 14, and 16 is removed, decommissioned, and/or fails during operation (e.g., on-line or offline) of the load 37.

As previously noted, the ASIC 40 may be useful in supporting both TMR and dual redundancy current output modes of operation. In either of the aforementioned current output modes (e.g., TMR and/or dual redundancy), the current driver sections 24, 26, and 28 may drive substantially equal current outputs, such that in the case that one of the control modules 12, 14, and 16 is removed, decommissioned, and/or fails, the control modules 12, 14, and 16 may be "hot-swapped," or replaced "on-line" with little to no disturbance to, for example, the load 37 (e.g., gas turbine). In such an embodiment, particularly under normal operating conditions, the processor 50 of the ASIC 40 may determine control actions based upon a "voting" (e.g., two-out-of-three) control logic. Specifically, if two processor(s) 50 of the three processor(s) 50 of each of the corresponding ASIC(s) 40, for example, agree after performing a bit-wise "majority vote" (e.g., outputting logic value 1 or 0) on the output, then a control determination may be made based upon the majority vote. In one embodiment, should two of the control modules 12, 14, and 16 be removed and/or fails, one of the control modules 12, 14, and 16 may be used to detect and control the total current (100%) output setpoint. If one or more "hot-swapped" or replaced control modules 12, 14, and 16 are then re-installed, the ASIC 40 may detect the commissioning of the re-installed control module. The ASIC 40 may then adjust the current sharing outputs (e.g., switch from 100% to 33% for TMR redundancy or 100% to 50% current sharing for dual redundancy) according to the number of commissioned control modules 12, 14, and 16. Particularly, since the ASIC 40 may monitor the operating condition of each the control modules 12, 14, and 16 and corresponding current output signals, the ASIC 40 may detect and compensate for various current output faults that may occur.

Figure 6:
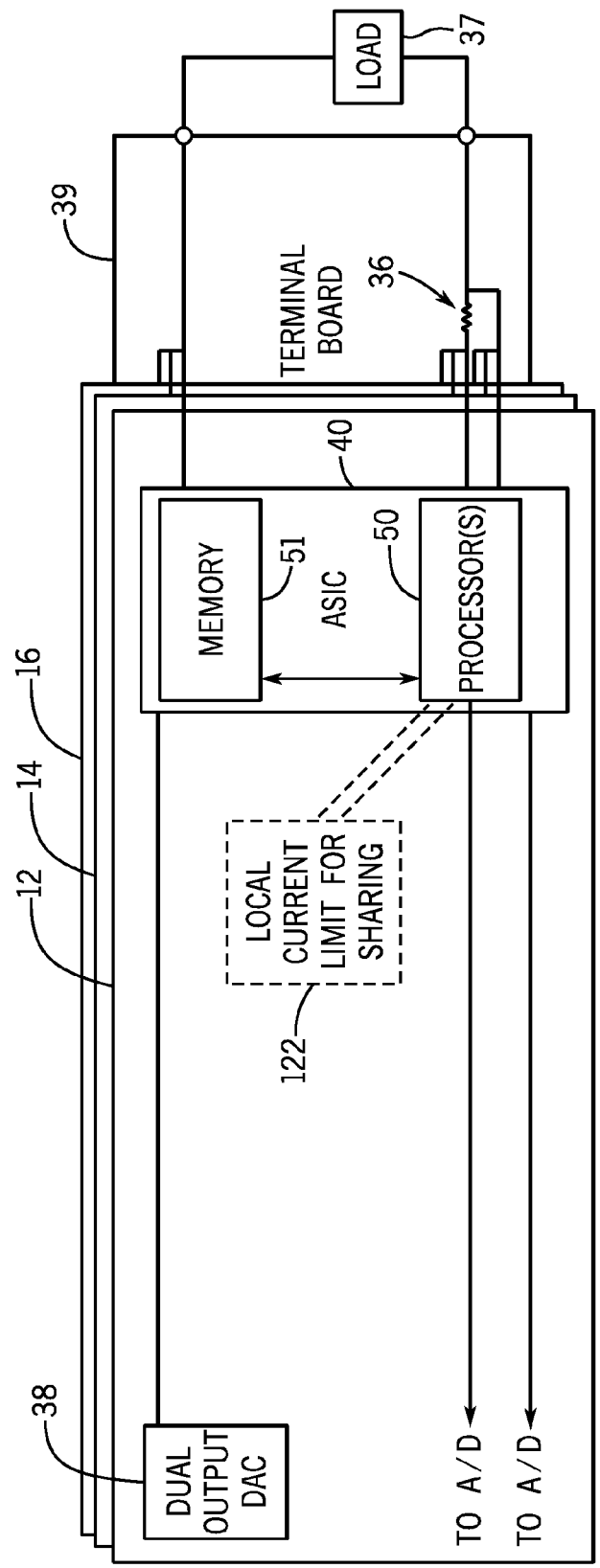
FIG. 6 is a block diagram of an embodiment of a Triple Modular Redundancy (TMR) controller including the universal I/O device of FIG. 3 in accordance with present embodiments.

As further illustrated in FIG. 5, in certain embodiments, the current driver section 24 may be communicatively coupled to a dual output DAC 38. It should be appreciated that the DAC 38 may be a dual voltage and/or current output DAC. In one embodiment, as depicted in FIG. 6, the DAC 38 may be directly coupled to the ASIC 40, in which the DAC 38 may be programmed to operate, for example, at the TMR shared current (e.g., 33%). In such an embodiment, the processor 50 (e.g., field programmable gate array (FPGA)) of the ASIC 40 may be used to detect the current received from the current sensors (e.g., current sensors 30 and 36 of FIG. 1) and control the operation of the DAC 38. Specifically, the shared current inputs may be compared to configurable control logic (e.g., fault control setpoint) of the processor(s) 50 of the ASIC 40 to determine possible "hot-swap" and/or connection interruptions of the control modules 12, 14, and 16. If such an interruption is detected, the ASIC 40 may reassign current sharing among the remaining operable control modules 12, 14, and 16. For example, the ASIC 40 may switch from TMR redundancy (e.g., 33% current sharing) including all three control modules 12, 14, and 16 to dual (e.g., 50% current sharing) and/or simplex (e.g., 100% of the total current) redundancy configurations including, for example, only one or two of the control modules 12, 14, and 16. In one embodiment, the ASIC 40 may perform a switch of redundancy modes within, for example, approximately 50 microseconds. In this way, a TMR and/or dual redundancy current output mode of operation may be implemented using discrete and/or digital inputs and outputs as opposed to primarily using analog inputs and outputs as would be the case with respect to the embodiment of FIG. 5.

Figure 7:
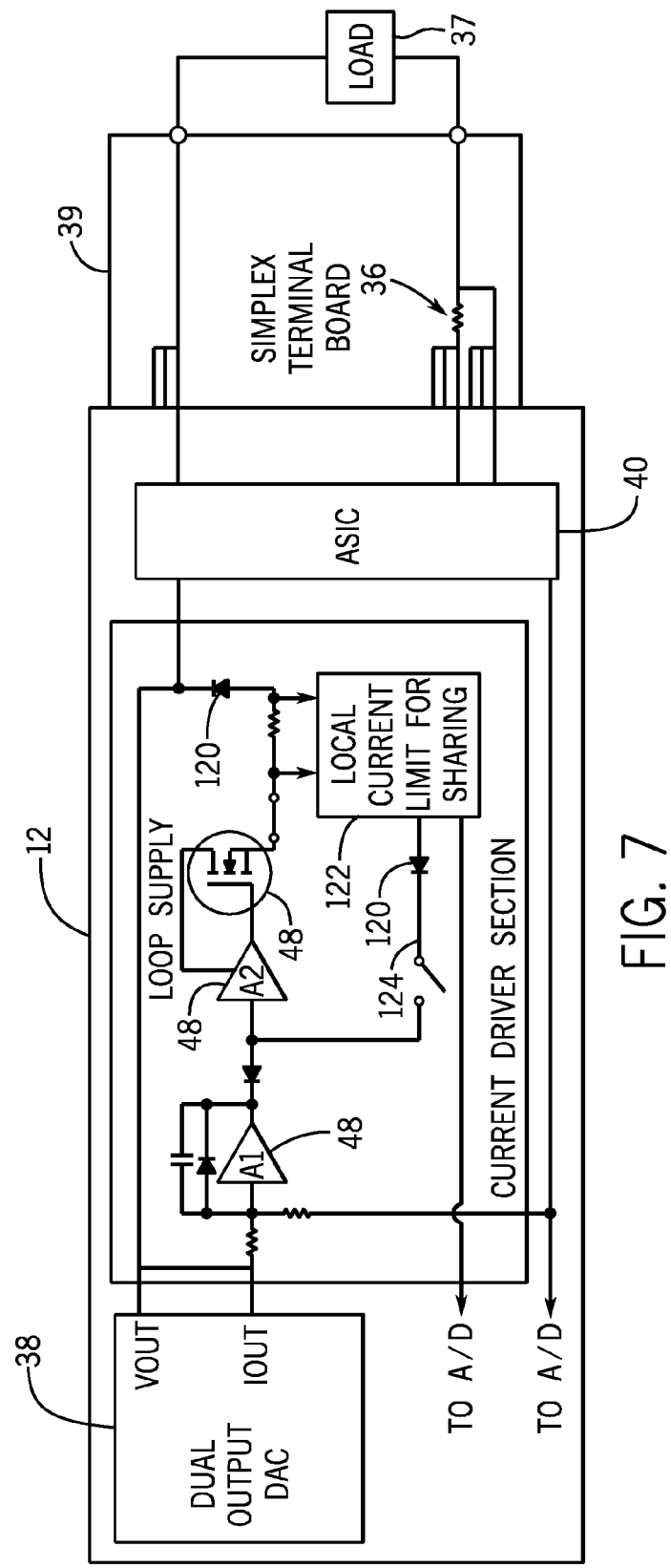
FIG. 7 is a block diagram of an embodiment of a Simplex controller including the universal I/O device of FIG. 3 in accordance with present embodiments.

FIG. 7 illustrates a simplex embodiment of the controller system 10. Similar to that discussed with respect to FIG. 5, the ASIC 40 may be communicatively coupled between the current driver section 24 and the TMR terminal board 39. However, in contrast to TMR operation, in simplex operation, the current driver section 24 may include a current sharing loop (e.g., analog and/or digital) to sense and operate, for example, at the total current (100%) setpoint of the current driver section 24 as opposed to, for example, a 33% (e.g., TMR) and/or 50% (e.g., dual redundancy) share of the total current setpoint (e.g., 100 mA). Similarly, the ASIC 40 may include the local current sensor 122 and switch 124 to detect and regulate the total current supplied by the control module 12. Specifically, the total current at the simplex terminal board 39 flowing through resistor 36 may be detected by the amplifier 48 of the ASIC 40, which may be used to adjust the analog driver loop to maintain the setpoint. In another embodiment, the processor 50 of the ASIC 40 may be used to detect and regulate the total current supplied by the control module 12.

As can be appreciated, the ASIC 40 may facilitate operating in each of the TMR current output mode, dual redundancy current output mode, as well as simplex current output mode. That is, because of the ability of the ASIC 40 to support multiple modes (e.g., voltage input and output mode, current input and output mode, RTD input and output mode, thermocouple input and output mode, communication input and output mode, and so forth) of operation including various current output modes (e.g., TMR, dual redundancy, and simplex), the need for dedicated (e.g., TMR-specific) I/O devices such as the system of FIG. 2 is accomplished by using a single UIO device. Thus, present embodiments of the ASIC 40 may allow the use of a UIO device with TMR, dual redundancy, and/or simplex connections for both input and output sensor types.

Technical effects of the present embodiments relate to a universal I/O device supporting TMR current output drivers. The UIO device is based on a switching block connecting control system resources to I/O terminals, where the switch block, amplifiers, and other data processing circuitry may be contained within a UIO application-specific integrated circuit (ASIC). The present embodiments allow for the ASIC to be connected in TMR, dual redundancy, and/or simplex configuration to sensing resistors and terminals of a field device control terminal board. Without the presently disclosed embodiments, TMR and dual redundancy current output modes of operation may require dedicated (e.g., TMR-specific and dual redundancy-specific) I/O devices to implement redundancy configurations. Thus, the present embodiments may allow the use of a UIO device with TMR, dual redundancy, and/or simplex connections for analog, discrete, and digital input and output signal types (e.g., voltage signals, current signals, physical sensor signals, communication signals, and so forth).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a triple modular redundant (TMR) control system comprising at least three controllers, wherein each controller of the at least three controllers, comprises:
a current driver system configured to detect and regulate a portion of a total current output of the TMR control system; and
a universal input-output (UIO) system comprising a plurality of universal input-output (UIO) ports, wherein the UIO system is configured to:
detect the portion of the total current output and the total current output of the TMR control system via one or more of the plurality of UIO ports;
compare the portion of the total current output and the total current output of the TMR control system; and
adjust the portion of the total current output according to a predetermined total current output threshold.

2. The system of claim 1, wherein each controller of the at least three controllers is configured to operate in parallel to each other controller of the at least three controllers, and wherein the total current output comprises a sum of the portion of the total current output of each controller of the at least three controllers.

3. The system of claim 1, wherein the portion of the total current output comprises approximately one-third of the total current output of the TMR control system.

4. The system of claim 1, wherein each of the plurality of UIO ports is configured to communicatively couple to a current sensor, a voltage sensor, a thermocouple, a resistance temperature detector (RTD), a highway addressable remote transducers (HART) device, an electronic system, or a combination thereof.

5. The system of claim 1, wherein the universal input-output (UIO) system included in a first controller of the at least three controllers is configured to detect a fault current associated with the first controller as an indication of a fault or a decoupling of the first controller from the TMR control system.

6. The system of claim 5, wherein the universal input-output (UIO) system included in a second controller of the at least three controllers and the universal input-output (UIO) system included in a third controller of the at least three controllers are configured to respectively share approximately one-half of the total current output of the TMR control system when the fault current associated with the first controller is detected.

7. The system of claim 6, wherein the universal input-output (UIO) system is configured to detect a fault current associated with the second controller of the at least three controllers as an indication of a fault or a decoupling of the second controller from the TMR control system.

8. The system of claim 7, wherein the universal input-output (UIO) system is configured to adjust the portion of the total current output by increasing the portion of the total current output of the third controller of the at least three controllers to approximately the total current output of the TMR control system.

9. The system of claim 1, comprising a turbine, a generator, or combination thereof, communicatively coupled to the TMR control system.

10. The system of claim 9, wherein the TMR control system is configured to regulate an output of the turbine, the generator, or the combination thereof, via only a first controller of the at least three controllers, a first controller and a second controller of the at least three controllers, or a first controller, a second controller, and a third controller of the at least three controllers.

11. A system, comprising:
a triple module redundant (TMR) control system comprising three controllers, wherein each controller of the three controllers comprises a universal input-output (UIO) system configured to:
detect a portion of a total current output and the total current output of the TMR control system via a plurality of universal input-output (UIO) ports;
compare the portion of the total current output and the total current output of the TMR control system; and adjust the portion of the total current output to maintain the total current output of the TMR control system based at least in part on the operability of one or more of the three controllers.

12. The system of claim 11, wherein the universal input-output (UIO) system comprises an application-specific integrated circuit (ASIC) communicatively coupled to a field programmable gate array (FPGA) device.

13. The system of claim 12, wherein the FPGA device is configured to detect the portion of the total current output, and the ASIC is configured to detect the total current output of the TMR control system, and wherein the portion of the total current output and the total current output of the TMR control system are each detected as an analog value, a discrete value, a digital value, or a combination thereof.

14. The system of claim 12, wherein the FPGA is configured to detect a fault current associated with a first controller of the three controllers as an indication of a decoupling of the first controller of the three controllers from the TMR control system.

15. The system of claim 11, wherein the universal input-output (UIO) system is configured to adjust the portion of the total current output based at least in part on whether one of the three controllers is decoupled from the TMR control system.

16. The system of claim 11, wherein the universal input-output (UIO) system is configured to adjust the portion of the total current output of each of the three controllers to approximately one-third of the total current output of the TMR control system when each of the three controllers is coupled to the TMR control system.

17. The system of claim 11, comprising:
a first controller;
a second controller; and
a third controller; wherein the universal input-output (UIO) system is configured to switch the TMR control system from a TMR mode of operation to a dual redundancy mode of operation upon a detection that the first controller is inoperable, and wherein, in the dual redundancy mode of operation, the universal input-output (UIO) system is configured to adjust the respective portions of the total current output of the second controller and the third controller to approximately one-half of the total current output of the TMR control system.

18. The system of claim 11, comprising:
a first controller;
a second controller; and
a third controller; wherein the universal input-output (UIO) system is configured to switch the TMR control system from a TMR mode of operation to a simplex mode of operation upon a detection that the first controller and the second controller is inoperable, and wherein, in the simplex mode of operation, the universal input-output (UIO) system is configured to adjust the portion of the total current output of the third controller to the total current output of the TMR control system.

19. The system of claim 11, wherein the TMR control system is configured to regulate an operating condition of a turbine communicatively coupled to the TMR control system, and wherein the TMR control system is configured to switch to one of a dual redundancy mode of operation and a simplex mode of operation without substantially interrupting operation of the turbine.

20. A non-transitory computer-readable medium having computer executable code stored thereon, the code comprising instructions to:
detect a portion of a total current output and the total current output of a triple module redundant (TMR) control system via a plurality of universal input-output (UIO) ports of a universal input-output (UIO) system;
compare the portion of the total current output and the total current output of the TMR control system; and
adjust the portion of the total current output according to a predetermined total current output threshold, wherein the portion of the total current output is adjusted based at least in part on whether one of three controllers of the TMR control system is decoupled from the TMR control system, and wherein the total current output is shared among another one or two controllers of the three controllers of the TMR control system when the one of the three controllers of the TMR control system is determined to be decoupled from the TMR control system.

* * * * *